(No Model.)

E. R. TRAMMELL.
FRICTION CLUTCH FOR THROTTLE VALVES.

No. 266,224. Patented Oct. 17, 1882.

Witnesses.
Edwin L. Yerkee
H. A. Toulmin

Inventor.
E. R. Trammell,
By E. M. Alexander, Atty.

UNITED STATES PATENT OFFICE.

ERASMUS R. TRAMMELL, OF BIRMINGHAM, ALABAMA.

FRICTION-CLUTCH FOR THROTTLE-VALVES.

SPECIFICATION forming part of Letters Patent No. 266,224, dated October 17, 1882.

Application filed June 14, 1882. (No model.)

To all whom it may concern:

Be it known that I, ERASMUS R. TRAMMELL, of Birmingham, in the county of Jefferson, and in the State of Alabama, have invented certain new and useful Improvements in Friction-Clutches for Throttle-Valves; and I do hereby declare that the following is a full, clear, and exact description thereof, reference being had to the accompanying drawings, and to the letters of reference marked thereon, making a part of this specification.

This invention relates to certain improvements in friction-clutches for all classes of levers, to hold the said levers in any desired position; but it is specially designed to be applied to the levers employed to control the throttle-valves of locomotive and other similar boilers, and secure the throttle-valve in any desired position with respect to its seat, as more fully hereinafter specified.

The objects of my invention I accomplish by the means illustrated in the accompanying drawings, in which—

Figure 1:
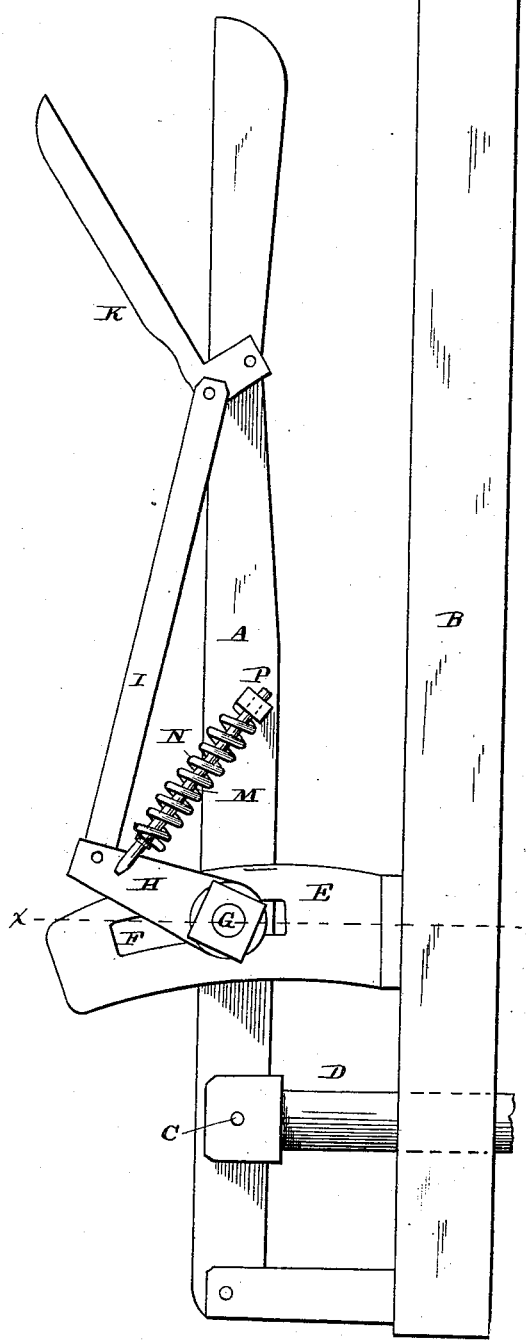
Figure 2:
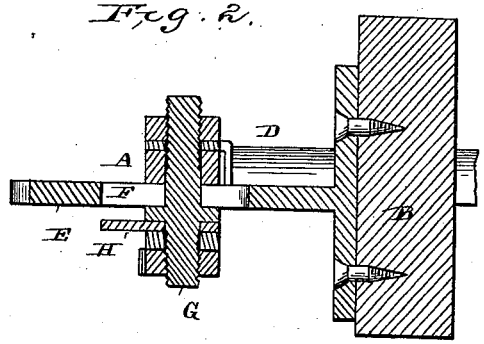
Figure 3:
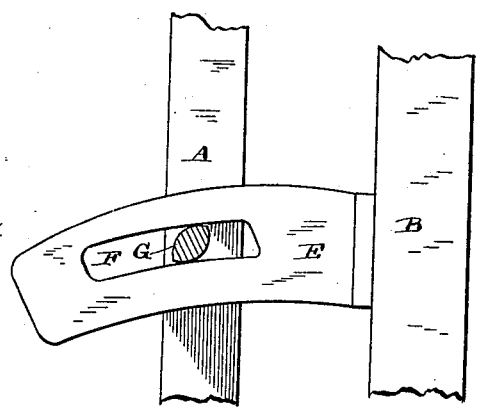

Figure 1 represents a side elevation of my improved friction-clutch applied to a lever. Fig. 2 represents a sectional view on the line x x of Fig. 1, and Fig. 3 represents a detached view of a portion of my device in side elevation.

The letter A indicates a lever, which is fulcrumed to a bracket, standard, or other support, B, secured to the boiler-head. The said lever has loosely connected to it at C the throttle-valve rod D, which extends into the boiler through the head of the same, as usual.

The letter E indicates a bracket, which is secured to the boiler-head and provided with a segmental slot, F, into which projects, or through which extends, a bolt, G, which is elliptical or approximately elliptical in cross-section, the said bolt being pivoted in a bearing in the lever A, so as to turn freely therein, and having rigidly fastened at one end an arm, H, which is connected by means of a link, I, with a lever, K.

The letter M indicates a bifurcated rod having a shoulder at its lower end, and N a spring surrounding the rod and bearing against a lug, P, on the lever A, (through which lug one end of the rod extends,) and against the shoulder of the rod, the recess setting against the edge of the arm H, so as to hold the parts in normal position. When in such position the bolt bends in the slot, as indicated in Fig. 3, and when it is required to operate the device the auxiliary lever is operated so as to bring the longer diameter of the elliptical bolt in a line parallel with the walls of the slot and relieve the said bolt, so as to permit the lever A to be moved.

Having thus described my invention, what I claim, and desire to secure by Letters Patent, is—

1. In combination with the lever fulcrumed to a bracket secured to the boiler-head, and having connected to it the throttle-valve rod, the bracket provided with a segmental slot, the bolt, elliptical or approximately elliptical in cross-section, the securing-nut, and the mechanism for securing or releasing the nut, substantially as and for the purposes specified.

2. In combination with the friction-clutch adapted to move and to be adjusted in a slotted bracket secured to the boiler, and the throttle-valve-rod lever attached to said clutch, the compound lever fulcrumed to the throttle-lever and connected with the friction-clutch, whereby said clutch may be operated, substantially as specified.

3. In combination with the friction-clutch, the slotted bracket and throttle-lever, the compound lever, and the spring secured to the friction-clutch and adapted to shift the parts to and from a normal position, substantially as specified.

In testimony whereof I affix my signature, in presence of two witnesses, this 19th day of May, 1882.

E. R. TRAMMELL.

Witnesses:
M. T. PORTER,
JOSEPH POUTCH.